US012695629B2

(12) United States Patent
Wang et al.

(10) Patent No.: US 12,695,629 B2
(45) Date of Patent: Jul. 28, 2026

(54) AUTHENTICATION METHOD AND APPARATUS

(71) Applicant: YINWANG INTELLIGENT TECHNOLOGIES CO., LTD., Shenzhen (CN)

(72) Inventors: Zhe Wang, Dongguan (CN); Yawen Wu, Shanghai (CN); Xuezhong Chu, Shenzhen (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 281 days.

(21) Appl. No.: 18/335,731

(22) Filed: Jun. 15, 2023

(65) Prior Publication Data

US 2023/0327869 A1 Oct. 12, 2023

Related U.S. Application Data

(63) Continuation of application No. PCT/CN2021/131545, filed on Nov. 18, 2021.

(30) Foreign Application Priority Data

Dec. 18, 2020 (CN) .......................... 202011503283.3

(51) Int. Cl.
*H04L 9/32* (2006.01)
*G06F 21/12* (2013.01)
(Continued)

(52) U.S. Cl.
CPC ............ *H04L 9/3271* (2013.01); *G06F 21/12* (2013.01); *G06F 21/44* (2013.01); *G06F 21/74* (2013.01);
(Continued)

(58) Field of Classification Search
CPC ....... H04L 63/06; H04L 63/061; H04L 63/12; H04L 63/123; H04L 9/08; H04L 9/0869;
(Continued)

(56) References Cited

U.S. PATENT DOCUMENTS 9,569,353 B2 * 2/2017 Miyake ............... G06F 12/0246
2013/0111582 A1 5/2013 Forest
(Continued)

FOREIGN PATENT DOCUMENTS

CN 103529823 B 4/2016
CN 106814675 A 6/2017
CN 117914557 A * 4/2024 ............. H04L 69/22

OTHER PUBLICATIONS

Kurachi et al., "Evaluation of Security Access Service in Automotive Diagnostic Communication," Proceedings of 2019 IEEE 89th Vehicular Technology Conference (VTC2019-Spring), Kuala Lumpur, Malaysia, Apr. 28-May 1, 2019, pp. 1-7.
(Continued)

*Primary Examiner* — Shaqueal D Wade-Wright
(74) *Attorney, Agent, or Firm* — Fish & Richardson P.C.

(57) ABSTRACT

This application provides example authentication methods and apparatuses. One example authentication method is used for a terminal device. The method includes receiving, by the first service unit, a first request from a second device, wherein the first request is used to request a first seed. The first service unit sends the first request to the first authentication unit. The first authentication unit sends a first response to the first service unit, wherein the first response comprises the first seed. The first service unit sends the first response to the second device. The first service unit receives a second seed from the second device. The first service unit sends the second seed to the first authentication unit. The first authentication unit determines a third seed based on a
(Continued)

first key and the second seed, wherein the first key is determined based on the first seed.

18 Claims, 8 Drawing Sheets

(51) Int. Cl.
*G06F 21/44* (2013.01)
*G06F 21/74* (2013.01)
*H04L 9/08* (2006.01)

(52) U.S. Cl.
CPC .......... *H04L 9/0819* (2013.01); *H04L 9/0863* (2013.01); *H04L 9/0869* (2013.01); *H04L 9/3226* (2013.01); *H04L 9/0816* (2013.01)

(58) Field of Classification Search
CPC ... H04L 9/0816; H04L 9/0819; H04L 9/0861; H04L 9/0838; H04L 9/0863; H04L 9/32; H04L 9/3226; H04L 9/3271; G06F 21/44; G06F 21/445; G06F 21/74; G06F 21/12
See application file for complete search history.

(56) References Cited

U.S. PATENT DOCUMENTS

| | | | | |
|---|---|---|---|---|
| 2014/0344920 A1* | 11/2014 | Jung | ....................... | G06F 21/62 |
| | | | | 726/17 |
| 2016/0035147 A1* | 2/2016 | Huang | .................. | H04L 9/3271 |
| | | | | 701/31.4 |
| 2018/0139191 A1* | 5/2018 | Shi | ......................... | H04L 63/123 |
| 2018/0357408 A1* | 12/2018 | Suzuki | .................... | G06F 21/44 |
| 2019/0349208 A1* | 11/2019 | Merchan | ............... | H04L 9/3278 |
| 2021/0288806 A1* | 9/2021 | Wakita | .................. | H04L 9/0869 |

OTHER PUBLICATIONS

Liu, "Design and Implementation of Vehicle Safety Management Platform Based on OBD," Thesis for the degree of Master, Beijing University of Technology, May 2018, 213 pages (with English translation).

Wang et al., "Security Access Control for Remote Automobile Fault Diagnosis System," Microprocessors, No. 2, Apr. 2013, 5 pages (with English translation).

Subke et al., "Measures to Prevent Unauthorized Access to the In-Vehicle E/E System, Due to the Security Vulnerability of a Remote Diagnostic Tester," SAE International, Mar. 28, 2017, 8 pages.

Ring et al., "Evaluation of Vehicle Diagnostics Security-Implementation of a Reproducible Security Access," Proceedings of SECURWARE 2014 : The Eighth International Conference on Emerging Security Information, Systems and Technologies, Nov. 16, 2014, 6 pages.

* cited by examiner

AUTHENTICATION METHOD AND APPARATUS

CROSS-REFERENCE TO RELATED APPLICATIONS

This application is a continuation of International Patent Application No. PCT/CN2021/131545, filed on Nov. 18, 2021, which claims priority to Chinese Patent Application No. 202011503283.3, filed on Dec. 18, 2020. The disclosures of the aforementioned applications are hereby incorporated by reference in their entireties.

TECHNICAL FIELD

This application relates to the field of communication technologies, and in particular, to an authentication method and apparatus.

BACKGROUND

With the development of communication technologies, more data is exchanged between devices. To avoid data leakage, when receiving a data request from an accessing device, an accessed device usually authenticates whether the accessing device has permission to access data. For example, a vehicle-mounted electronic control unit (ECU) first authenticates permission of a tester that requests access, and then provides data to the tester or receives a firmware update from the tester.

However, the accessed device directly authenticates the permission of the accessing device in a service unit. Consequently, an unauthorized user easily uses service information in the service unit to attack or crack an authentication process of the accessed device, to obtain access permission. For example, a program that can be remotely accessed in the ECU is used to send key information such as a key material to a terminal of the unauthorized user. This easily causes data leakage of the accessed device, and even causes a program in the accessed device to be modified. Therefore, how to improve security of an authentication process is a technical problem that needs to be urgently resolved.

SUMMARY

Embodiments of this application provide an authentication method and apparatus, to resolve a problem that an authentication process is easily attacked or cracked because permission of an accessing device is authenticated in a service unit, to improve security of the authentication process.

To achieve the foregoing objective, the following technical solutions are used in this application.

According to a first aspect, an authentication method is provided. The authentication method is applied to a first device, and the first device may include a first service unit and a first authentication unit. The authentication method includes: The first service unit receives a first request from a second device, where the first request is used to request a first seed. The first service unit sends the first request to the first authentication unit. The first authentication unit sends a first response to the first service unit, where the first response may include the first seed. The first service unit sends the first response to the second device. The first service unit receives a second seed from the second device. The first service unit sends the second seed to the first authentication unit. The first authentication unit determines a third seed based on a first key and the second seed. The first key is determined based on the first seed. The first authentication unit determines a matching result between the third seed and the first seed. The first authentication unit sends the matching result to the first service unit. The first service unit sends the matching result to the second device.

Based on the authentication method according to the first aspect, the first device interacts with the second device through the first service unit, to transmit information such as the first seed and the second seed; stores key information in the first authentication unit to avoid leakage, for example, information such as the first key; and performs an authentication operation only in the first authentication unit, to determine whether the second device has access permission. In this way, the authentication operation in the first authentication unit may be isolated from service information in the first service unit, to resolve a problem that an authentication process is easily attacked or cracked because permission of an accessing device is authenticated in a service unit, to improve security of the authentication process.

In a possible design solution, the authentication method according to the first aspect may further include: The first authentication unit determines the first key based on a first key material, a first key generation algorithm, and the first seed. The first key material and the first key generation algorithm may be stored in the first authentication unit. In this way, the service information is isolated from authentication-related information, and related information in the authentication process is prevented from being stolen by using the service information, to ensure security of the authentication process.

Optionally, the first request may include an access level. Correspondingly, before the first authentication unit determines the first key based on a first key material, a first key generation algorithm, and the first seed, the authentication method according to the first aspect may further include: The first authentication unit determines the first key material and the first key generation algorithm based on the access level. The access level may be related to a purpose of an access request of the second device. For example, if an access request 1 sent by the second device may be used to request to access data of the first device, the access request 1 may correspond to an access level 1; if an access request 2 sent by the second device may be used to request to modify a program of the first device, the access request 2 may correspond to an access level 4. In this way, the first device may determine, based on the access level, a purpose of accessing the first device by the second device, so that the first key material and the first key generation algorithm that correspond to the access purpose can be determined, to further improve security of the authentication process.

In addition, if a second authentication unit also stores a correspondence between an access level and a set of a second key material and a second key generation algorithm, and the first authentication unit stores a set of a plurality of first key materials and a plurality of first key generation algorithms, the first authentication unit may quickly determine, based on the access level, a set of a first key material and a first key generation algorithm that correspond to the second key material and the second key generation algorithm, to improve authentication efficiency.

In another possible design solution, that the first service unit sends the second seed to the first authentication unit may include: The first service unit sends the second seed and identification information to the first authentication unit, where the identification information corresponds to the first key. Correspondingly, before the first authentication unit determines a third seed based on a first key and the second seed, the authentication method according to the first aspect may further include: The first authentication unit may determine the first key based on the identification information. In this way, only the identification information may be transmitted between the first authentication unit and the first service unit, and a key does not need to be transmitted, so that the key information is isolated from the service information in the first service unit, to further improve security of the authentication process.

In addition, if the first device needs to authenticate permission of a plurality of second devices, the first authentication unit may store a plurality of first keys. After the first device receives second seeds from the plurality of second devices, the first authentication unit may further quickly determine a corresponding first key based on identification information corresponding to the first key, to improve efficiency of authenticating permission by the first authentication unit.

Further, the authentication method according to the first aspect may further include: The first authentication unit sends the identification information to the first service unit, where the identification information is determined based on the first key. In this way, the identification information corresponding to the first key is generated in the first authentication unit, to prevent an unauthorized user from attacking and cracking the first key by using the service information, to improve security of the authentication process.

Optionally, the authentication method according to the first aspect may further include: The first authentication unit deletes the first key. In this way, when the second device accesses the first device again, the first authentication unit may re-generate a key to authenticate the permission of the second device again, to prevent the unauthorized user from masquerading as the second device to access the first device after the access of the second device ends, and further improve security of the authentication process.

According to a second aspect, an authentication method is provided. The authentication method is applied to a second device, and the second device may include a second service unit and a second authentication unit. The authentication method includes: The second authentication unit sends a first request to the second service unit, where the first request is used to request a first seed. The second service unit sends the first request to a first device. The second service unit receives a first response from the first device, where the first response may include the first seed. The second service unit sends the first response to the second authentication unit. The second authentication unit sends a second seed to the second service unit. The second seed is determined based on the first seed and a second key, and the second key is determined based on the first seed. The second service unit sends the second seed to the first device. The second service unit receives a matching result sent by the first device.

In a possible design solution, the method according to the second aspect may further include: The second authentication unit determines the second key based on a second key material, a second key generation algorithm, and the first seed. The second key material and the second key generation algorithm may be stored in the second authentication unit.

Optionally, the method according to the second aspect may further include: The second authentication unit deletes the second key.

In addition, for technical effects of the authentication method according to the second aspect, refer to the technical effects of the authentication method according to the first aspect. Details are not described herein again.

According to a third aspect, an authentication apparatus is provided. The authentication apparatus includes a first service unit and a first authentication unit. The first service unit is configured to receive a first request from a second device, where the first request is used to request a first seed. The first service unit is further configured to send the first request to the first authentication unit. The first authentication unit is configured to send a first response to the first service unit, where the first response includes the first seed. The first service unit is further configured to send the first response to the second device. The first service unit is further configured to receive a second seed from the second device. The first service unit is further configured to send the second seed to the first authentication unit. The first authentication unit is further configured to determine a third seed based on a first key and the second seed. The first key is determined based on the first seed. The first authentication unit is further configured to determine a matching result between the third seed and the first seed. The first authentication unit is further configured to send the matching result to the first service unit. The first service unit is further configured to send the matching result to the second device.

In a possible design solution, the first authentication unit is further configured to determine the first key based on a first key material, a first key generation algorithm, and the first seed, where the first key material and the first key generation algorithm are stored in the first authentication unit.

Optionally, the first request may include an access level. Correspondingly, the first authentication unit is further configured to determine the first key material and the first key generation algorithm based on the access level.

In another possible design solution, the first service unit is further configured to send the second seed and identification information to the first authentication unit, where the identification information corresponds to the first key. The first authentication unit is further configured to determine the first key based on the identification information.

Further, the first authentication unit is further configured to send the identification information to the first service unit, where the identification information is determined based on the first key.

Optionally, the first authentication unit is further configured to delete the first key.

Optionally, the first service unit and the first authentication unit may be integrated into one unit, for example, a processing unit. The processing unit is configured to implement a processing function of the authentication apparatus according to the third aspect.

Optionally, the authentication apparatus according to the third aspect may further include a storage unit, and the storage unit stores a program or instructions. When the processing unit executes the program or the instructions, the authentication apparatus according to the third aspect may perform the authentication method according to the first aspect.

Optionally, the authentication apparatus according to the third aspect may further include a transceiver unit. The transceiver unit is configured to implement receiving and sending functions of the authentication apparatus according to the third aspect. Further, the transceiver unit may include a receiving unit and a sending unit. The receiving unit and the sending unit are respectively configured to implement the receiving function and the sending function of the authentication apparatus according to the third aspect.

It should be noted that, the authentication apparatus according to the third aspect may be a terminal device, a chip (system) or another part or component that may be disposed in the terminal device, or an apparatus that includes the terminal device. This is not limited in this application.

It should be understood that the authentication apparatus according to the third aspect includes a corresponding module, unit, or means for implementing the authentication method according to the first aspect. The module, unit, or means may be implemented by hardware, may be implemented by software, or may be implemented by hardware executing corresponding software. The hardware or software includes one or more modules or units configured to perform functions related to the foregoing authentication method.

In addition, for technical effects of the authentication apparatus according to the third aspect, refer to the technical effects of the authentication method according to the first aspect. Details are not described herein again.

According to a fourth aspect, an authentication apparatus is provided. The authentication apparatus includes a second service unit and a second authentication unit, where the second authentication unit is configured to send a first request to the second service unit, where the first request is used to request a first seed. The second service unit is configured to send the first request to a first device. The second service unit is further configured to receive a first response from the first device, where the first response includes the first seed. The second service unit is further configured to send the first response to the second authentication unit. The second authentication unit is further configured to send a second seed to the second service unit. The second seed is determined based on the first seed and a second key, and the second key is determined based on the first seed. The second service unit is further configured to send the second seed to the first device. The second service unit is further configured to receive a matching result sent by the first device.

In a possible design solution, the second authentication unit is further configured to determine the second key based on a second key material, a second key generation algorithm, and the first seed. The second key material and the second key generation algorithm are stored in the second authentication unit.

Optionally, the second authentication unit is further configured to delete the second key.

Optionally, the second service unit and the second authentication unit may be integrated into one unit, for example, a processing unit. The processing unit is configured to implement a processing function of the authentication apparatus according to the fourth aspect.

Optionally, the authentication apparatus according to the fourth aspect may further include a storage unit, and the storage unit stores a program or instructions. When the processing unit executes the program or the instructions, the authentication apparatus according to the fourth aspect may perform the authentication method according to the second aspect.

Optionally, the authentication apparatus according to the fourth aspect may further include a transceiver unit. The transceiver unit is configured to implement receiving and sending functions of the authentication apparatus according to the fourth aspect. Further, the transceiver unit may include a receiving unit and a sending unit. The receiving unit and the sending unit are respectively configured to implement the receiving function and the sending function of the authentication apparatus according to the fourth aspect.

It should be noted that, the authentication apparatus according to the fourth aspect may be a terminal device, a chip (system) or another part or component that may be disposed in the terminal device, or an apparatus that includes the terminal device. This is not limited in this application.

It should be understood that the authentication apparatus according to the fourth aspect includes a corresponding module, unit, or means for implementing the authentication method according to the second aspect. The module, unit, or means may be implemented by hardware, may be implemented by software, or may be implemented by hardware executing corresponding software. The hardware or software includes one or more modules or units configured to perform functions related to the foregoing authentication method.

In addition, for technical effects of the authentication apparatus according to the fourth aspect, refer to the technical effects of the authentication method according to the second aspect. Details are not described herein again.

According to a fifth aspect, an authentication apparatus is provided. The authentication apparatus is configured to perform the authentication method according to the first aspect or the second aspect.

In this application, the authentication apparatus according to the fifth aspect may be the first device according to the first aspect, the second device according to the second aspect, a chip (system) or another part or component that may be disposed in the foregoing devices, or an apparatus that includes the foregoing devices.

It should be understood that the authentication apparatus according to the fifth aspect includes a corresponding module, unit, or means for implementing the authentication method according to the first aspect or the second aspect. The module, unit, or means may be implemented by hardware, may be implemented by software, or may be implemented by hardware executing corresponding software. The hardware or software includes one or more modules or units configured to perform functions related to any one of the foregoing authentication methods.

In addition, for technical effects of the authentication apparatus according to the fifth aspect, refer to the technical effects of the authentication method according to the first aspect or the second aspect. Details are not described herein again.

According to a sixth aspect, an authentication apparatus is provided. The authentication apparatus includes a processor, and the processor is configured to perform the authentication method according to the first aspect or the second aspect.

In a possible design solution, the authentication apparatus according to the sixth aspect may further include a transceiver. The transceiver may be a transceiver circuit or an interface circuit. The transceiver may be used by the authentication apparatus according to the sixth aspect to communicate with another authentication apparatus.

In a possible design solution, the authentication apparatus according to the sixth aspect may further include a memory. The memory may be integrated with the processor, or may be disposed separately from the processor. The memory may be configured to store a computer program and/or data related to the authentication method according to the first aspect or the second aspect.

In this application, the authentication apparatus according to the sixth aspect may be the first device according to the first aspect, the second device according to the second aspect, a chip (system) or another part or component that may be disposed in the foregoing devices, or an apparatus that includes the foregoing devices.

In addition, for technical effects of the authentication apparatus according to the sixth aspect, refer to the technical effects of the authentication method according to the first aspect or the second aspect. Details are not described herein again.

According to a seventh aspect, an authentication apparatus is provided. The authentication apparatus includes a processor, where the processor is coupled to a memory, and the processor is configured to execute a computer program stored in the memory, so that the authentication apparatus performs the authentication method according to the first aspect or the second aspect.

In a possible design solution, the authentication apparatus according to the seventh aspect may further include a transceiver. The transceiver may be a transceiver circuit or an interface circuit. The transceiver may be used by the authentication apparatus according to the seventh aspect to communicate with another authentication apparatus.

In this application, the authentication apparatus according to the seventh aspect may be the first device according to the first aspect, the second device according to the second aspect, a chip (system) or another part or component that may be disposed in the foregoing devices, or an apparatus that includes the foregoing devices.

In addition, for technical effects of the authentication apparatus according to the seventh aspect, refer to the technical effects of the authentication method according to the first aspect or the second aspect. Details are not described herein again.

According to an eighth aspect, an authentication apparatus is provided, including a processor and a memory. The memory is configured to store a computer program, and when the processor executes the computer program, the authentication apparatus is enabled to perform the authentication method according to the first aspect or the second aspect.

In a possible design solution, the authentication apparatus according to the eighth aspect may further include a transceiver. The transceiver may be a transceiver circuit or an interface circuit. The transceiver may be used by the authentication apparatus according to the eighth aspect to communicate with another authentication apparatus.

In this application, the authentication apparatus according to the eighth aspect may be the first device according to the first aspect, the second device according to the second aspect, a chip (system) or another part or component that may be disposed in the foregoing devices, or an apparatus that includes the foregoing devices.

In addition, for technical effects of the authentication apparatus according to the eighth aspect, refer to the technical effects of the authentication method according to the first aspect or the second aspect. Details are not described herein again.

According to a ninth aspect, an authentication apparatus is provided, including a processor. The processor is configured to: after being coupled to a memory and reading a computer program in the memory, perform the authentication method according to the first aspect or the second aspect based on the computer program.

In a possible design solution, the authentication apparatus according to the ninth aspect may further include a transceiver. The transceiver may be a transceiver circuit or an interface circuit. The transceiver may be used by the authentication apparatus according to the ninth aspect to communicate with another authentication apparatus.

In this application, the authentication apparatus according to the ninth aspect may be the first device according to the first aspect, the second device according to the second aspect, a chip (system) or another part or component that may be disposed in the foregoing devices, or an apparatus that includes the foregoing devices.

In addition, for technical effects of the authentication apparatus according to the ninth aspect, refer to the technical effects of the authentication method according to the first aspect or the second aspect. Details are not described herein again.

According to a tenth aspect, a processor is provided. The processor is configured to perform the authentication method according to the first aspect or the second aspect.

According to an eleventh aspect, an authentication system is provided. The authentication system includes a first device and a second device.

According to a twelfth aspect, a computer-readable storage medium is provided, including a computer program or instructions. When the computer program or the instructions are run on a computer, the computer is enabled to perform the authentication method according to the first aspect or the second aspect.

According to a thirteenth aspect, a computer program product is provided, including a computer program or instructions. When the computer program or the instructions are run on a computer, the computer is enabled to perform the authentication method according to the first aspect or the second aspect.

DESCRIPTION OF EMBODIMENTS

The following describes existing technical solutions with reference to the accompanying drawings.

In a unified diagnostic service (UDS) protocol, if a tester needs to access data in an electronic control unit, the electronic control unit authenticates permission of the tester in advance. For a specific authentication implementation, refer to an authentication system shown in FIG. 1.

Figure 1:
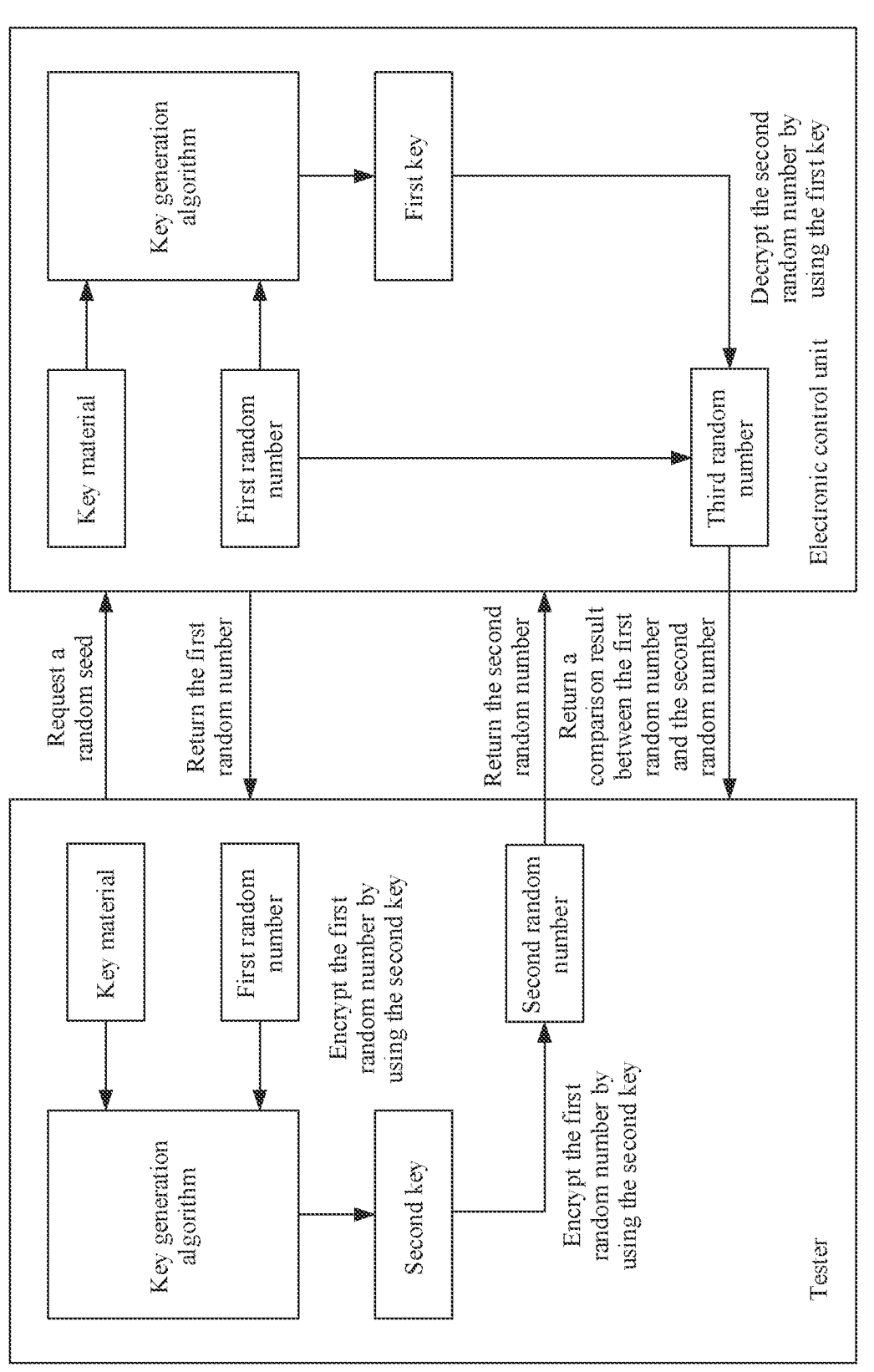
FIG. 1 is a schematic interaction diagram of an authentication system.

Refer to FIG. 1. The authentication system includes a tester and an electronic control unit. The tester and the electronic control unit each store a key material and a key generation algorithm. The tester may initiate a security access request to the electronic control unit, where the security access request is used to request the electronic control unit to return a random seed.

Therefore, the electronic control unit may generate a first random number (seed), and return the first random number to the tester, where the first random number is used to request the tester to generate a corresponding key in a same key generation manner as the electronic control unit. In addition, the electronic control unit may generate a first key based on the key generation algorithm and the key material that are stored in the electronic control unit and the first random number.

After the tester receives the returned first random number, the tester may generate a second key in the same key generation manner as the electronic control unit, that is, based on the key generation algorithm and the key material that are stored in the tester and the first random number. In addition, the tester may encrypt the first random number by using the second key, to obtain a second random number (seed'), and send the second random number to the electronic control unit, where the second random number corresponds to the second key.

Correspondingly, the electronic control unit may decrypt the second random number by using the previously generated first key, to obtain a third random number ("seed"), and compare whether the first random number is the same as the third random number. If the first random number is the same as the third random number, it indicates that the electronic control unit may determine that the tester can generate the same key as the electronic control unit in the same key generation manner as the electronic control unit, that is, determine that the key material and the key generation algorithm that are stored in the tester are the same as the key material and the key generation algorithm that are stored in the electronic control unit, and the electronic control unit may determine that the tester has access permission, and return a comparison result between the first random number and the third random number to the tester. Similarly, if the first random number is not the same as the third random number, the electronic control unit may determine that the tester does not have access permission, return a comparison result to the tester, and reject the access request.

In the foregoing authentication system, the electronic control unit directly authenticates the permission of the tester in a service running environment, and even places a key material and an encryption algorithm in the service running environment. In addition to information required for authentication, there is further service information in the service running environment, such as a management program of the electronic control unit or a program for remotely accessing data of the electronic control unit. In this way, an unauthorized user easily uses other service information to enter the electronic control unit, attacks or cracks an authentication process in the service running environment, and steals a key material and an encryption algorithm in the service running environment, resulting in low security of the authentication process.

To improve security of an authentication process, an embodiment of this application provides an authentication method. A service unit and an authentication unit are disposed, and an authentication operation is performed only in the authentication unit that is isolated from a service running environment, to improve security of the authentication process. The following describes technical solutions of this application with reference to the accompanying drawings.

The technical solutions of this application may be used in various authentication systems, or various communication systems that need to perform an authentication method, for example, a wireless fidelity (Wi-Fi) system, a vehicle-to-everything (V2X) communication system, a device-to-device (D2D) communication system, and an internet of vehicles communication system.

Various aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may also be used.

In addition, in embodiments of this application, terms such as "example" and "for example" are used to represent giving an example, an illustration, or a description. Any embodiment or design solution described as an "example" in this application should not be explained as being more preferred or having more advantages than another embodiment or design solution. Specifically, the term "example" is used to present a concept in a specific manner.

In embodiments of this application, terms "information", "signal", "message", "channel", and "signaling" may sometimes be interchangeably used. It should be noted that meanings expressed by the terms are consistent when differences of the terms are not emphasized. Terms "of", "corresponding" and "relevant" may sometimes be interchangeably used. It should be noted that meanings expressed by the terms are consistent when differences of the terms are not emphasized.

In embodiments of this application, sometimes a subscript such as $W_1$ may be written in an incorrect form such as W1. Meanings expressed by the terms are consistent when differences of the terms are not emphasized.

First, technical terms in embodiments of this application are described.

1. A security sandbox is a security mechanism in the computer security field, and is an isolated environment provided for a running program. The security sandbox can usually strictly control a resource that can be accessed by an application program. For example, operations such as network access, computer system access, and data reading in a computer are usually forbidden or strictly limited in the security sandbox.

Figure 2:
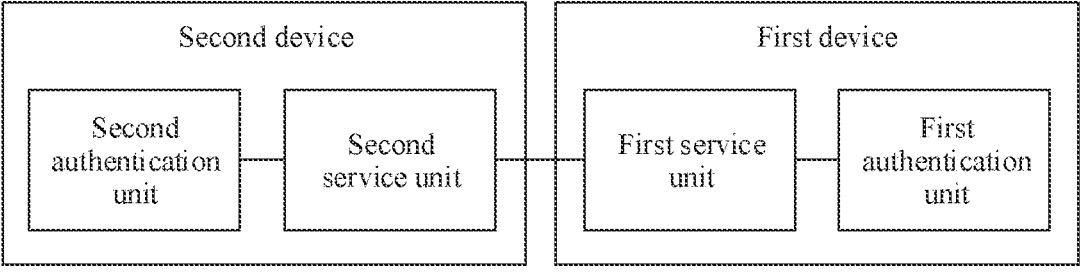
FIG. 2 is a first schematic architectural diagram of an authentication system according to an embodiment of this application.
Figure 3:
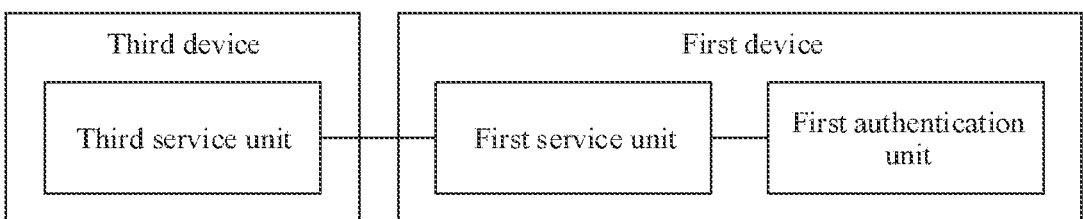
FIG. 3 is a second schematic architectural diagram of an authentication system according to an embodiment of this application.

For ease of understanding, the following uses authentication systems shown in FIG. 2 and FIG. 3 as an example to describe in detail an authentication system to which an authentication method provided in embodiments of this application is applicable.

In a possible design solution, FIG. 2 is a first schematic architectural diagram of an authentication system according to an embodiment of this application. As shown in FIG. 2, the authentication system includes a first device and a second device. There may be one or more first devices, and the first device may include a first service unit and a first authentication unit. Correspondingly, there may be one or more second devices, and the second device may include a second service unit and a second authentication unit.

For example, if the first service unit of the first device receives an access request from the second service unit of the second device, the first device may perform an authentication service in the first authentication unit, and the second device may also perform a corresponding authentication service in the second authentication unit, so that the first device may authenticate whether the second device has access permission. For a specific implementation, refer to the following method embodiments shown in FIG. 4 and FIG. 5. Details are not described herein again.

Optionally, when there are a plurality of second devices, the first device shown in FIG. 2 may include a plurality of first service units (not shown in FIG. 2), and different first service units are respectively configured to: receive access requests from different second devices, and forward the access requests to a first authentication unit, so that the first device may simultaneously authenticate permission of the plurality of second devices. For a specific implementation, refer to the following method embodiments. Details are not described herein.

Optionally, when there are a plurality of first devices, the second device shown in FIG. 2 may include a plurality of second service units (not shown in FIG. 2). Different second service units may receive a corresponding access request from a second authentication unit, and separately send the access request to a corresponding first device, so that the second device may send authentication requests to the plurality of first devices, to access the plurality of first devices. For a specific implementation, refer to the following method embodiments. Details are not described herein.

In another possible design solution, FIG. 3 is a second schematic architectural diagram of an authentication system to which an authentication method is applicable according to an embodiment of this application. As shown in FIG. 3, the authentication system includes a first device and a third device. There may be one or more first devices, and the first device may include a first service unit and a first authentication unit. There may be one or more third devices, and the third device may include a third service unit.

For example, if the first device receives an access request from the third device, the third device may also perform an authentication method in a manner in a conventional technology, that is, directly perform an authentication service in the third service unit, and the first device may perform an authentication service in the first authentication unit, so that the first device may authenticate whether the third device has access permission. For a specific implementation, refer to the following method embodiments shown in FIG. 6 and FIG. 7. Details are not described herein again.

Optionally, when there are a plurality of third devices, the first device shown in FIG. 3 may include a plurality of first service units (not shown in FIG. 3), and different first service units are respectively configured to: receive access requests from different third devices, and forward the access requests to a first authentication unit, so that the first device may simultaneously authenticate permission of the plurality of third devices. For a specific implementation, refer to the following method embodiments. Details are not described herein.

With reference to the two authentication systems shown in FIG. 2 and FIG. 3, the following describes in detail the first device and the second device that are shown in FIG. 2 and the first device and the third device that are shown in FIG. 3.

The first device, the second device, and the third device may be terminals that access the foregoing authentication system and have a wireless transceiver function, or may be chips or chip systems that may be disposed in the terminals. The terminal device may also be referred to as a user apparatus, an access terminal, a subscriber unit, a remote terminal, a mobile device, a user terminal, a terminal, a wireless communication device, a user agent, or user equipment. The terminal device in embodiments of this application may be a wireless terminal in self driving, a wireless terminal in transportation safety, a vehicle-mounted terminal, an RSU having a terminal function, or the like. The terminal device in this application may alternatively be a vehicle-mounted module, a vehicle-mounted component, an onboard component, a vehicle-mounted chip, or a vehicle-mounted unit that is built in a vehicle as one or more components or units, for example, a tester or a vehicle-mounted electronic control unit. The vehicle uses the vehicle-mounted module, the vehicle-mounted component, the onboard component, the vehicle-mounted chip, or the vehicle-mounted unit that is built in the vehicle, to implement the authentication method provided in this application.

Correspondingly, the first service unit, the second service unit, the third service unit, the first authentication unit, and the second authentication unit may be chips, chip systems, or other parts or components disposed in the foregoing devices. Functions of the first service unit, the second service unit, and the third service unit may be implemented by using calculation units in the foregoing devices, and may interact with another device and exchange information required in an authentication process with a corresponding authentication unit, for example, information such as an access request and a random seed. Functions of the first authentication unit and the second authentication unit may be implemented by using security units in the foregoing devices, and an authentication method may be performed in a built-in security sandbox of the security unit, or a corresponding key material and key encryption algorithm may be encrypted and stored by using hardware. For a specific implementation, refer to the following method embodiments. Details are not described herein.

It should be noted that, the solutions in embodiments of this application may also be used in another authentication system, and a corresponding name may alternatively be replaced with a name of a corresponding function in the another authentication system.

It should be understood that FIG. 2 or FIG. 3 is merely a simplified schematic diagram that is used as an example for ease of understanding. The authentication system may further include another first device and/or another second device that are/is not shown in FIG. 2 or FIG. 3.

The following describes in detail the authentication methods provided in embodiments of this application with reference to FIG. 4 to FIG. 7.

Figure 4:
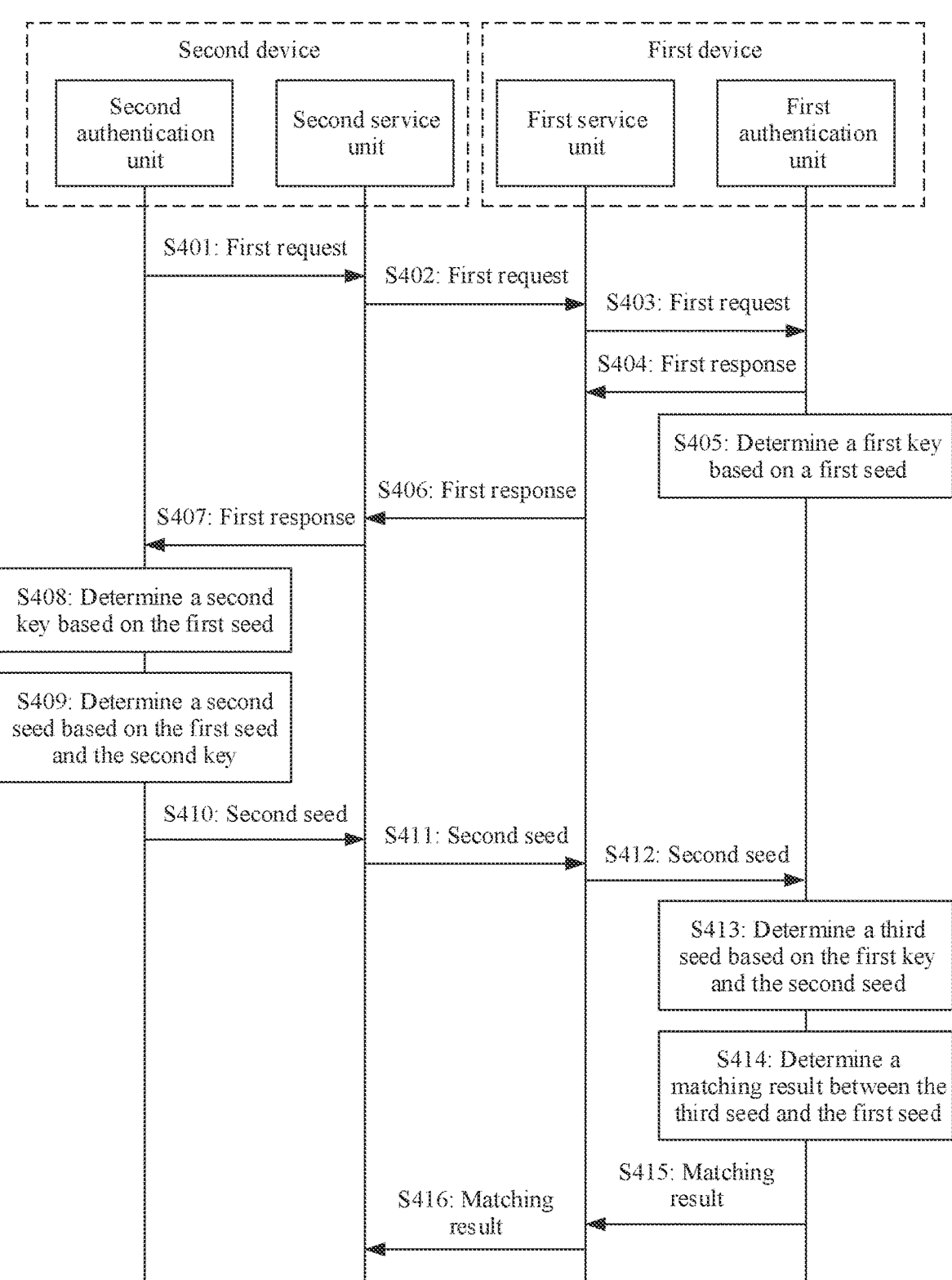
FIG. 4 is a first schematic flowchart of an authentication method according to an embodiment of this application.

For example, FIG. 4 is a first schematic flowchart of an authentication method according to an embodiment of this application. The authentication method is applicable to the authentication system shown in FIG. 2. The following uses the authentication system shown in FIG. 2 as an example for description.

As shown in FIG. 4, the authentication method includes the following steps.

S401: A second authentication unit sends a first request to a second service unit, and the second service unit receives the first request from the second authentication unit. The first request is used to request a first seed (seed 1).

Specifically, the first request may be transmitted between the second authentication unit and the second service unit through an internal bus or a signal cable. A specific implementation of information transmission between the second authentication unit and the second service unit is not limited in this embodiment of this application.

S402: The second service unit sends the first request to a first service unit, and the first service unit receives the first request from the second service unit.

For example, the second authentication unit may be the second authentication unit in the second device shown in FIG. 2, and the second service unit may be the second service unit in the second device shown in FIG. 2. The second authentication unit may store authentication-related information, for example, information such as the first request and a second key, and may also perform an authentication operation in the second authentication unit, for example, determine the first request and generate the second key. The second service unit forwards only the authentication-related information, and does not need to perform an authentication operation, to improve security of an authentication process. The first request may be an authentication request, the first seed may be a random number generated by a first device, and the random number may be used to authenticate permission of the second device. For a specific implementation of the first seed, refer to related content in S416. Details are not described herein again.

When the second device needs to access data in the first device, the second authentication unit in the second device may generate the first request, and send the first request to the second service unit. Therefore, the second service unit may forward the first request to the first device, so that the first device determines the permission of the second device. In this way, the second service unit in the second device may forward the authentication-related information and perform a service operation other than the authentication operation, and the second authentication unit in the second device may perform only the authentication operation, to ensure that the authentication operation is isolated from service information in the second service unit, prevent key information from being stolen by using the service information, and further improve security of the authentication process in the second device.

It should be noted that, the first device may authenticate the permission of the second device provided with the second authentication unit and the second service unit, or may authenticate permission of an existing second device provided with only a service unit. For a specific implementation, refer to the following method embodiment shown in FIG. 6. Details are not described herein again.

In addition, a message, such as the first request, may be transmitted between the second service unit and the first service unit in a wired or wireless manner. The wired manner may include a transmission manner such as a cable, an optical fiber, or a network cable, and the wireless manner may include a wireless connection that is based on one or more wireless communication protocols. A specific implementation of information transmission between the second service unit and the first service unit is not limited in this embodiment of this application.

S403: The first service unit sends the first request to a first authentication unit, and the first authentication unit receives the first request from the first service unit.

S404: The first authentication unit sends a first response to the first service unit, and the first service unit receives the first response from the first authentication unit. The first response includes the first seed.

Specifically, in S403 and S404, the first request and first response may be transmitted between the first service unit and the first authentication unit through an internal bus or a signal cable. A specific implementation of information transmission between the first service unit and the first authentication unit is not limited in this embodiment of this application.

For example, the first service unit may be the first service unit in the first device shown in FIG. 2, and the first authentication unit may be the first authentication unit in the first device shown in FIG. 2. The first authentication unit may store authentication-related information, for example, information such as the first seed and a first key (key 1), and may also perform an authentication operation, for example, generate the first seed and generate the first key, in the first authentication unit. The first service unit forwards only the authentication-related information, such as the first seed and the second seed, and does not need to perform an authentication operation, to improve security of the authentication process. The first seed may be a pseudo random number in a pseudo random number sequence obtained through calculation by using a deterministic algorithm, and the pseudo random number sequence is evenly distributed in [0, 1]. It should be noted that the pseudo random number is merely an example of the first seed, and a specific implementation of the first seed is not limited in this embodiment of this application.

When the first device receives the first request, the first service unit may forward the first request to the first authentication unit, so that the first authentication unit may generate a random number as the first seed, and the first service unit forwards the first seed to the second device, so that both the first device and the second device may generate a corresponding key based on the same first seed, and then authenticate, based on the key, whether the second device has permission. In this way, the first service unit in the first device may forward the authentication-related information and perform a service operation other than the authentication operation, and the first authentication unit in the first device may perform only the authentication operation, to ensure that the authentication operation is isolated from service information in the first service unit, prevent key information from being stolen by using the service information, and further improve security of the authentication process in the first device.

It should be noted that the first service unit may establish a session between the first device and the second device based on the first request, and generate and return a corresponding session identifier to the second device.

For example, the session identifier may include a device identifier of the first device or an address identifier of the first device. In this way, if the first device needs to simultaneously authenticate permission of a plurality of second devices, when the first service unit receives information from the second device again, the first service unit may perform a corresponding action based on the session identifier, for example, send the session identifier to the first authentication unit, to find the first seed corresponding to the second device. For a specific implementation of the session identifier, refer to the following related descriptions of S412 or S413. Details are not described herein again.

S405: The first authentication unit determines the first key based on the first seed.

For example, the first key is a key generated by the first authentication unit based on the first seed, and the first key may be used to decrypt the second seed transmitted by the second device, to obtain a third seed, and therefore authenticate, by comparing whether the third seed obtained through decryption is the same as the first seed, whether the first device has permission. For a specific implementation of authentication by using the first key, refer to the following related description of S413. Details are not described herein again.

In a possible design solution, that the first authentication unit determines the first key based on the first seed in S405 may include: The first authentication unit determines the first key based on a first key material, a first key generation algorithm, and the first seed. In this way, generating the first key in the first authentication unit may be isolated from another service in the service unit, to improve security of the authentication process.

The first key material and the first key generation algorithm are stored in the first authentication unit.

For example, the first key material may be a group of data that is set in the first authentication unit before delivery, and the first key generation algorithm may be an algorithm that is set in the first authentication unit before delivery. The algorithm is used to generate a corresponding key based on a key material and the first seed, so that the generated first key may correspond to the first key material and the first key generation algorithm, for example, an encryption algorithm such as an advanced encryption standard (AES) or an RSA encryption algorithm. It should be noted that the foregoing encryption algorithms are merely several examples of the first key generation algorithm, and a specific implementation of the first key generation algorithm is not limited in this embodiment of this application.

Correspondingly, before delivery of the first device and the second device, a same key material and a same key generation algorithm may be encapsulated in the first authentication unit in the first device and the second authentication unit of the second device that has access permission. Therefore, in a process in which the first device authenticates the permission of the second device, the first device and the second device may generate a same key based on a same random seed, so that the second device can access data in the first device through authentication of the first device. Specifically, for an implementation of the first key material and the first key generation algorithm, refer to the following related descriptions of S416. Details are not described herein again.

It should be noted that the first authentication unit may store a plurality of first key materials and a plurality of first key generation algorithms. When the first device receives requests from different second devices, the first authentication unit may generate a corresponding key by using a first key material and a first key generation algorithm that correspond to a second device, to authenticate permission of the corresponding second device. The following describes a specific implementation of determining the first key material and the first key generation algorithm.

Optionally, the first request may include an access level (level id). Correspondingly, before the first authentication unit determines the first key based on a first key material, a first key generation algorithm, and the first seed, the authentication method shown in FIG. 4 may further include: The first authentication unit determines the first key material and the first key generation algorithm based on the access level.

For example, the access level may be information indicating an access purpose of an access request. Correspondingly, the first authentication unit may store a correspondence between an access level and a set of a first key material and a first key generation algorithm, and the first authentication unit may determine, based on different access levels, a first key material and a first key generation algorithm that correspond to the access request.

For example, it is assumed that the access level is a level indicating a danger degree, for example, access levels range from 1 to N. N is a positive integer. If the access purpose of the access request is that the second device needs to access data in the first device, the second authentication unit may set an access level corresponding to the access request to a level 2. Correspondingly, the first authentication unit may select a corresponding set A of a first key material and a first key generation algorithm based on the access level 2. If the access purpose of the access request is that the second device needs to modify a program in the first device, the second authentication unit may set an access level corresponding to the access request to a level 5. Correspondingly, the first authentication unit may select a corresponding set B of a first key material and a first key generation algorithm based on the access level 5.

In this way, the first device may determine, based on the access level, a purpose of accessing the first device by the second device, so that the first key material and the first key generation algorithm that correspond to the access purpose can be determined, that is, targeted authentication is performed on the permission of the second device, to improve security of the authentication process.

It should be noted that one access level may correspond to a set of a key generation algorithm and a key material, and a set of a key generation algorithm and a key material may correspond to one or more access levels. A specific correspondence between a set of a key generation algorithm and a key material and an access level is not limited in this embodiment of this application.

Further, if the second authentication unit also stores a correspondence between an access level and a set of a second key material and a second key generation algorithm, and the first authentication unit stores a set of a plurality of first key materials and a plurality of first key generation algorithms, the first authentication unit may quickly determine, based on the access level, a set of a first key material and a first key generation algorithm that correspond to the second key material and the second key generation algorithm, to improve authentication efficiency.

The foregoing example is still used for description. It is assumed that the second authentication unit stores a set C of a second key material and a second key generation algorithm, and the set C corresponds to the access level 2. In this case, the first authentication unit may quickly determine, based on the access level 2, the set A of the first key material and the first key generation algorithm that corresponds to the set B. Specifically, for an implementation of the first key material and the first key generation algorithm, refer to the following related descriptions of S416. Details are not described herein again.

Optionally, the first authentication unit may determine the corresponding first key material and the corresponding first key generation algorithm based on a device identifier of the second device.

For example, the device identifier of the second device may be identification information determined by the first service unit based on the first request, and a correspondence between a device identifier and a set of a first key material and a first key generation algorithm may be prestored in the first authentication unit. In this way, when the first authentication unit stores a set of a plurality of first key materials and a plurality of first key generation algorithms, the first authentication unit may quickly determine, based on the device identifier, a set of a first key material and a first key generation algorithm that correspond to the second key material and the second key generation algorithm in the second device, to improve authentication efficiency.

Optionally, the authentication method shown in FIG. 4 may further include: The first authentication unit sends identification information (key id) to the first service unit, where the identification information is determined based on the first key.

For example, the identification information may be an identifier of the first key. In this way, the first key is stored in the first authentication unit, only the identification information may be transmitted between the first service unit and the first authentication unit, and a key does not need to be transmitted. This implements isolation between the service information and the first key, avoids stealing the first key by using the service information, and ensures security of the authentication process. For a specific implementation of determining the first key based on the identification information, refer to the following related descriptions of S413. Details are not described herein again.

It should be noted that, if the first authentication unit needs to simultaneously authenticate permission of a plurality of second devices, a plurality of first keys may be stored. The first authentication unit may alternatively quickly determine a corresponding first key based on identification information corresponding to the first key, to improve efficiency of authenticating permission by the first authentication unit.

It should be noted that S405 may be performed after the first authentication unit determines the first seed, that is, after S404, or may be performed before the first device performs decryption by using the first key, that is, before S413. An execution sequence of S405 is not limited in this embodiment of this application, and S405 may be performed before or after any one of S406 to S412 is performed.

S406: The first service unit sends a first response to the second service unit, and the second service unit receives the first response from the first service unit. The first response includes the first seed.

Specifically, the first response may be transmitted between the second service unit and the first service unit in a wired or wireless manner. For a specific implementation, refer to the foregoing related descriptions of S402. Details are not described herein again.

S407: The second service unit sends the first response to the second authentication unit, and the second authentication unit receives the first response from the second service unit.

Specifically, the first response may be transmitted between the second service unit and the second authentication unit through a communication bus or a signal cable. For a specific implementation of information transmission between the second service unit and the second authentication unit, refer to the foregoing related descriptions of S401. Details are not described herein again.

S408: The second authentication unit determines the second key (key 2) based on the first seed.

For example, the second key is a key generated by the second authentication unit based on the first seed, and the second key may be used to encrypt the first seed transmitted by the first device, to obtain the second seed (seed 2), so that the first device may decrypt the second seed by using the first key, to obtain the third seed (seed 3), and further determine, through comparison, whether the third seed is the same as the first seed, to authenticate whether the first device has permission.

It should be noted that, in a manner in which the first service unit interacts with the second device and the second service unit forwards the first seed to the second authentication unit, the service information may be isolated from the authentication operation, so that an unauthorized user cannot attack the authentication unit by using the service information, to improve security of the authentication process.

Optionally, that the second authentication unit determines the second key based on the first seed in S408 may include: The second authentication unit determines the second key based on the second key material, the second key generation algorithm, and the first seed. In this way, generating the second key in the second authentication unit may be isolated from another service in the second service unit, to improve security of the authentication process.

The second key material and the second key generation algorithm are stored in the second authentication unit.

For example, a specific implementation of the second key material and the second key generation algorithm is similar to the implementation of the first key material and the first key generation algorithm in S405, and details are not described herein again.

It should be noted that, in a key generation process, the first device and the second device each generate, based on the same first seed, the corresponding first key and the corresponding second key by using the key material and the key generation algorithm that are stored in each of the first device and the second device. In this way, it may be determined, by authenticating whether the first key and the second key that are generated by the second device are the same, whether the key material and the key generation algorithm that are stored in the first device are the same as those stored in the second device, so that the first device may determine that the second device having the same key material and the same key generation algorithm is the second device having the access permission. For a specific implementation of authenticating whether the first key is the same as the second key, refer to the following related descriptions of S416. Details are not described herein again.

Optionally, if the first service unit establishes the session between the first device and the second device based on the first request, and generates the corresponding session identifier in S404, the first response may further include the session identifier. In this way, the first device and the second device may subsequently identify, by using the session identifier, information exchanged between the first device and the second device. For a specific implementation of the session identifier, refer to the following related descriptions of S412 or S413. Details are not described herein again.

Further, if the second authentication unit stores a set of a plurality of second key materials and a plurality of second key generation algorithms, so that the second device may access a plurality of first devices, the second authentication unit may quickly determine a corresponding set of a second key material and a second key generation algorithm based on the session identifier or the device identifier of the first device, to obtain a corresponding second key, thereby improving authentication efficiency.

S409: The second authentication unit determines the second seed based on the first seed and the second key.

For example, the second authentication unit may encrypt the first seed by using the second key, to obtain the second seed, that is, the second seed is a ciphertext corresponding to the first seed. In this way, the first seed is encrypted in the second authentication unit, so that an encryption process may be isolated from other service information, to prevent the unauthorized user from stealing the second key in the encryption process, and improve security of the authentication process.

It should be noted that, because the second seed is the corresponding ciphertext obtained by encrypting the first seed by using the second key, the second seed may be subsequently decrypted by using the first key, to compare whether the decrypted seed is the same as the first seed, and further authenticate whether the first key is the same as the second key. For a specific implementation of the second seed, refer to the following related descriptions of S413. Details are not described herein again.

Optionally, the authentication method shown in FIG. 4 may further include: The second authentication unit deletes the second key. In this way, when the second device accesses the first device again, the second authentication unit may re-generate a key to authenticate the permission of the second device again, to prevent the unauthorized user from masquerading as the second device to access the first device after the access of the second device ends, and further improve security of the authentication process.

It should be noted that the step in which the second authentication unit deletes the second key may be performed after the second seed is determined, that is, after S409, or may be performed after a matching result from the first device is received, that is, after S416. An execution sequence of the step in which the second authentication unit deletes the second key is not limited in this embodiment of this application, and the step may be performed before or after any one of S410 to S416 is performed.

S410: The second authentication unit sends the second seed to the second service unit, and the second service unit receives the second seed from the second authentication unit.

Specifically, the second authentication unit and the second service unit may transmit the second seed through the internal bus or the signal cable. A specific implementation of transmitting the second seed between the second authentication unit and the second service unit is similar to the specific implementation of transmitting the first request in S401. Details are not described herein again.

S411: The second service unit sends the second seed to the first service unit, and the first service unit receives the second seed from the second service unit.

Specifically, the second seed may be transmitted between the second service unit and the first service unit in a wired or wireless manner. A specific implementation of transmitting the second seed between the second service unit and the first service unit is similar to the specific implementation of transmitting the first request in S402, or is similar to the specific implementation of transmitting the first response in S406. Details are not described herein again.

S412: The first service unit sends the second seed to the first authentication unit, and the first authentication unit receives the second seed from the first service unit.

In this way, through forwarding of the second service unit and the first service unit, the first authentication unit may receive the second seed from the second authentication unit, so that the authentication process may be isolated from other service information, to improve security of the authentication process. For a specific implementation of the second seed, refer to the following related descriptions of S413. Details are not described herein again.

Optionally, if the first response further includes the session identifier in S406, that the second service unit sends the second seed to the first service unit, and the first service unit receives the second seed from the second service unit in S411 may include: The second service unit sends the second seed and the session identifier to the first service unit, and the first service unit receives the second seed and the session identifier from the second service unit.

Further, that the first service unit sends the second seed to the first authentication unit, and the first authentication unit receives the second seed from the first service unit in S412 may include: The first service unit sends the second seed and the session identifier to the first authentication unit, and the first authentication unit receives the second seed and the session identifier from the first service unit.

In this way, when the first device simultaneously authenticates permission of a plurality of second devices, the first device may quickly find, based on the session identifier, information related to the authentication process of the second device. For example, the second authentication unit may quickly determine, based on the session identifier, the first seed corresponding to the second seed. For a specific implementation of the session identifier, refer to the following related descriptions of S413. Details are not described herein again.

In addition, the first authentication unit and the first service unit may transmit the second seed through the internal bus or the signal cable. A specific implementation of transmitting the second seed between the first authentication unit and the first service unit is similar to the specific implementation of transmitting the first request and the first response in S403 or S404. Details are not described herein again.

S413: The first authentication unit determines the third seed based on the first key and the second seed.

For example, the first authentication unit may decrypt the second seed by using the first key, to obtain the third seed, that is, the third seed is a plaintext corresponding to the second seed. In this way, based on that the second seed is obtained by encrypting the first seed by the second device by using the second key, the first authentication unit may determine, by comparing whether the third seed is the same as the first seed, whether the first key is the same as the second key, to determine whether the second device has the same key material and key generation algorithm as the first device, and further determine whether the second device has the access permission. For a specific implementation of comparing the third seed with the first seed, refer to the following related descriptions of S414. Details are not described herein again.

Optionally, that the first service unit sends the second seed to the first authentication unit, and the first authentication unit receives the second seed from the first service unit in S412 may include: The first service unit sends the second seed and the identification information to the first authentication unit, and the first authentication unit receives the second seed and the identification information from the first service unit. The identification information corresponds to the first key. Correspondingly, before S413, the authentication method shown in FIG. 4 may further include: The first authentication unit determines the first key based on the identification information.

For example, the first service unit may send the identification information to the first authentication unit. Therefore, the first authentication unit may invoke the first key corresponding to the identification information, so that the service information in the first service unit is isolated from the first key, to improve storage security of the first key.

In addition, when the first authentication unit stores a plurality of first keys, the first authentication unit may alternatively quickly find, based on the identification information, the first key corresponding to the second seed, to improve efficiency of authenticating the permission of the second device.

Optionally, if the first service unit receives the second seed and the session identifier from the second device in S411, before the first service unit sends the second seed and the identification information to the first authentication unit, the authentication method shown in FIG. 4 may further include: The first service unit determines the corresponding identification information based on the session identifier.

For example, when the first device simultaneously authenticates permission of a plurality of second devices, the first service unit may store a plurality of pieces of identification information, and the first service unit may directly and quickly determine, based on the session identifier, the identification information corresponding to the second seed, to improve authentication efficiency.

Optionally, the authentication method shown in FIG. 4 may further include: The first authentication unit deletes the first key.

In this way, when the second device accesses the first device again, the first authentication unit may re-generate a key to authenticate the permission of the second device again, to prevent the unauthorized user from masquerading as the second device to access the first device after the access of the second device ends, and further improve security of the authentication process.

It should be noted that the step in which the first authentication unit deletes the first key may be performed after the third seed is determined, that is, after S413, or may be performed after the matching result is sent to the second device, that is, after S416. An execution sequence of the step in which the first authentication unit deletes the first key is not limited in this embodiment of this application, and the step may be performed before or after any one of S414 to S416 is performed.

S414: The first authentication unit determines a matching result between the third seed and the first seed.

S415: The first authentication unit sends the matching result to the first service unit, and the first service unit receives the matching result from the first authentication unit.

Specifically, the first authentication unit and the first service unit may transmit the matching result through the internal bus or the signal cable. A specific implementation of transmitting the matching result between the first authentication unit and the first service unit is similar to the specific implementation of transmitting the first request and the first response in S403 or S404. Details are not described herein again.

S416: The first service unit sends the matching result to the second service unit, and the second service unit receives the matching result from the first service unit.

For example, the matching result may indicate whether the second device has the access permission. If the matching result is that the third seed is the same as the first seed, it may indicate that the first key generated by the first device is the same as the second key generated by the second device, so that it may be determined that the first key material and the first key generation algorithm in the first device are the same as the second key material and the second key generation algorithm in the second device. In this way, it may indicate that the second device has the permission to access the first device, and the first device may allow the second device to perform access.

Correspondingly, if the matching result is that the third seed is different from the first seed, it may indicate that the first key generated by the first device is different from the second key generated by the second device, so that the first key material and the first key generation algorithm in the first device may be different from the second key material and the second key generation algorithm in the second device. In this way, it may indicate that the second device has no permission to access the first device, and the first device may not allow the second device to perform access.

In this way, the first device determines, in the first authentication unit, the matching result between the first seed and the third seed, and then the second service unit forwards the matching result to the second service unit, so that the authentication process may be isolated from the other service information, to improve security of the authentication process.

It should be noted that the first authentication unit may determine the corresponding first seed based on the first key, or may directly and quickly determine the corresponding first seed based on session identification information. A specific implementation of determining the first seed by the first authentication unit is not specifically limited in this embodiment of this application.

It should be noted that in S416, if the matching result is that the third seed is the same as the first seed, the first service unit may send the matching result to the second service unit. If the matching result is that the third seed is different from the first seed, and a timeout mechanism is set on the second device, that is, the second device starts timing when S411 is performed. When timing duration reaches preset duration, the second device determines that authentication performed by the first device fails, and the first device rejects the access request, the first service unit may not send the matching result to the second service unit. If the matching result is that the third seed is different from the first seed, and a timeout mechanism is not set on the second device, the first service unit may alternatively send the matching result to the second service unit, that is, S416 is an optional step.

In addition, the matching result may be transmitted between the second service unit and the first service unit in a wired or wireless manner. For a specific implementation of transmitting the matching result between the second service unit and the first service unit, refer to the specific implementation of transmitting the first request in S402. Details are not described herein again.

In addition, after the second device learns of the matching result, if the matching result is that the third seed is the same as the first seed, the second device may send, to the first device, an access request corresponding to an access level. The access request may be used to request data corresponding to the first device, or may be used to request the first device to receive a program from the second device. A specific implementation of the access request is not limited in this embodiment of this application.

Correspondingly, if the matching result is that the third seed is different from the first seed, access of the second device is rejected by the first device, so that the second device may send a second request to the first device. The second request may be used to request the first device to authenticate the access permission of the second device again. A step performed by the second device after the authentication is completed is not limited in this embodiment of this application.

Based on the authentication method shown in FIG. 4, the first device interacts with the second device through the first service unit, to transmit information such as the first seed and the second seed; stores key information in the first authentication unit to avoid leakage, for example, information such as the first key; and performs an authentication operation only in the first authentication unit, to determine whether the second device has access permission. In this way, the authentication operation in the first authentication unit may be isolated from service information in the first service unit, to resolve a problem that an authentication process is easily attacked or cracked because permission of an accessing device is authenticated in a service unit, to improve security of the authentication process.

Figure 5:
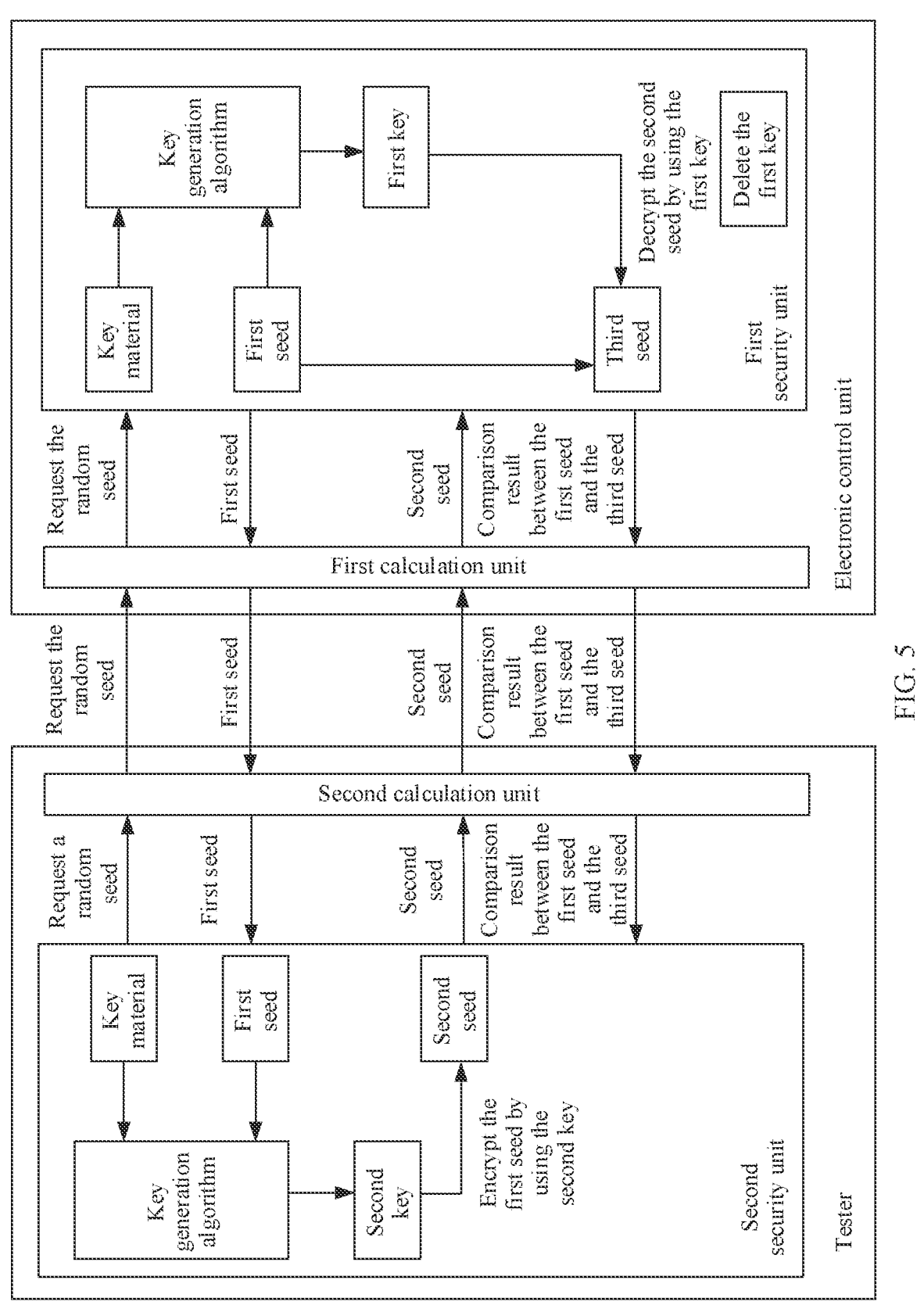
FIG. 5 is a first schematic interaction diagram of an authentication system according to an embodiment of this application.

For example, FIG. 5 is a first schematic interaction diagram of an authentication system according to an embodiment of this application. The authentication system may specifically implement the authentication method shown in FIG. 4.

As shown in FIG. 5, the authentication system includes an electronic control unit and a tester. The electronic control unit may include a first calculation unit and a first security unit, and the tester may include a second calculation unit and a second security unit.

The foregoing first device may be the electronic control unit shown in FIG. 5, and the foregoing second device may be the tester shown in FIG. 5. A function of the first authentication unit shown in FIG. 4 may be implemented by the first security unit shown in FIG. 5, and a function of the first service unit shown in FIG. 4 may be implemented by the first calculation unit shown in FIG. 5. A function of the second authentication unit shown in FIG. 4 may be implemented by the second security unit shown in FIG. 5, and a function of the second service unit shown in FIG. 4 may be implemented by the second calculation unit shown in FIG. 5.

As shown in FIG. 5, the second security unit of the tester may initiate a security access request to the second calculation unit, the second calculating unit may send the security access request to the first calculation unit of the electronic control unit, and the first calculation unit sends the security access request to the first security unit, where the security access request may be used to request the electronic control unit to return a random seed.

Therefore, the first security unit may generate a first seed (seed 1), and send the first seed to the first calculation unit, the first calculation unit forwards the first seed to the tester, and the second calculation unit may forward the first seed to the second security unit. A first seed is used to request the second security unit to generate a corresponding key in a same key generation manner as the first security unit. In addition, the first security unit may generate a first key (key 1) based on the first seed and a key generation algorithm and a key material that are stored in the first security unit.

After the second security unit receives the returned first seed, the second security unit may generate a second key (key 2) in the same key generation manner as the first security unit, that is, based on a key generation algorithm and a key material that are stored in the second security unit and the first seed. In addition, the second security unit may encrypt the first seed by using the second key, to obtain a second seed (seed 2), and forward the second seed to the first security unit through the second calculation unit and the first calculation unit sequentially.

Correspondingly, the first security unit may decrypt the second seed by using the previously generated first key, to obtain a third seed (seed 3), and compare whether the first seed is the same as the third seed. If the first seed is the same as the third seed, it indicates that the first security unit may determine that the second security unit can generate the same key as the first security unit in the same key generation manner as the first security unit, that is, determine that the key material and the key generation algorithm that are stored in the second security unit are the same as the key material and the key generation algorithm that are stored in the first security unit, and the first security unit may determine that the tester corresponding to the second security unit has access permission, and return a comparison result between the first seed and the third seed to the tester. The electronic control unit may allow the tester to perform access. Similarly, if the first seed is not the same as the third seed, the first security unit may determine that the tester does not have access permission, and return a comparison result to the tester, and the electronic control unit may reject the access request of the tester.

In this way, authentication-related information such as a key, a key material, and a key generation algorithm is stored in a security unit, and the security unit performs an authentication operation, to ensure that the authentication operation is isolated from service information in a calculation unit, prevent an unauthorized user from stealing the authentication-related information by using the service information, and further improve security of an authentication process.

Figure 6:
FIG. 6 is a second schematic flowchart of an authentication method according to an embodiment of this application.

For example, FIG. 6 is a second schematic flowchart of an authentication method according to an embodiment of this application. The authentication method is applicable to the authentication system shown in FIG. 3. The following uses the communication system shown in FIG. 3 as an example for description.

As shown in FIG. 6, the authentication method includes the following steps.

S601: A third service unit sends a third request to a first service unit, and the first service unit receives the third request from the third service unit. The third request is used to request a fourth seed (seed 4).

For example, the third service unit may be the third authentication unit in the third device shown in FIG. 3, and the first service unit may be the first service unit in the first device shown in FIG. 3. The third service unit may store authentication-related information and perform an authentication operation, and may further perform another service besides the authentication operation, for example, a management service of the third device and an update service of the third device. For a specific implementation of the authentication operation of the third service unit, refer to the specific implementation of the second authentication unit shown in FIG. 4. Details are not described herein again.

S602: The first service unit sends the third request to a first authentication unit, and the first authentication unit receives the third request from the first service unit.

S603: The first authentication unit sends a third response to the third service unit, and the third service unit receives the third response from the first authentication unit. The third response includes the fourth seed.

S604: The first authentication unit determines a third key (key 3) based on the fourth seed.

S605: The first service unit sends the third response to the third service unit, and the third service unit receives the third response from the first service unit. The third response includes the fourth seed.

For a specific implementation of S602 to S605, refer to S403 to S406. Details are not described herein again.

S606: The third service unit determines a fourth key (key 4) based on the fourth seed.

S607: The third service unit determines a fifth seed (seed 5) based on the fourth seed and the fourth key.

S608: The third service unit sends the fifth seed to the first service unit, and the first service unit receives the fifth seed from the third service unit.

For example, the third device may directly perform an authentication-related service in the third service unit. For a specific implementation in which the third service unit performs authentication, refer to the related content in S408 to S411. Details are not described herein again.

S609: The first service unit sends the fifth seed to the first authentication unit, and the first authentication unit receives the fifth seed from the first service unit.

S610: The first authentication unit determines a sixth seed (seed 6) based on the third key and the fifth seed.

S611: The first authentication unit determines a matching result between the fourth seed and the sixth seed.

S612: The first authentication unit sends the matching result to the first service unit, and the first service unit receives the matching result from the first authentication unit.

S613: The first service unit sends the matching result to the third service unit, and the third service unit receives the matching result from the first service unit.

For a specific implementation of S609 to S613, refer to S412 to S416. Details are not described herein again.

Based on the authentication method described in FIG. 5, the first device may authenticate permission of the second device that is shown in FIG. 2 and that is provided with the service unit and the authentication unit, and may also authenticate permission of the third device that is shown in FIG. 3 and that is provided with only the service unit. An authentication method performed by an existing device may be the same as an authentication method performed in a conventional technology, so that the authentication method provided in this embodiment of this application is compatible with the conventional technology.

The following uses the architecture of the authentication system shown in FIG. 3 as an example to describe in detail a specific implementation of the authentication method shown in FIG. 6 in the authentication system.

Figure 7:
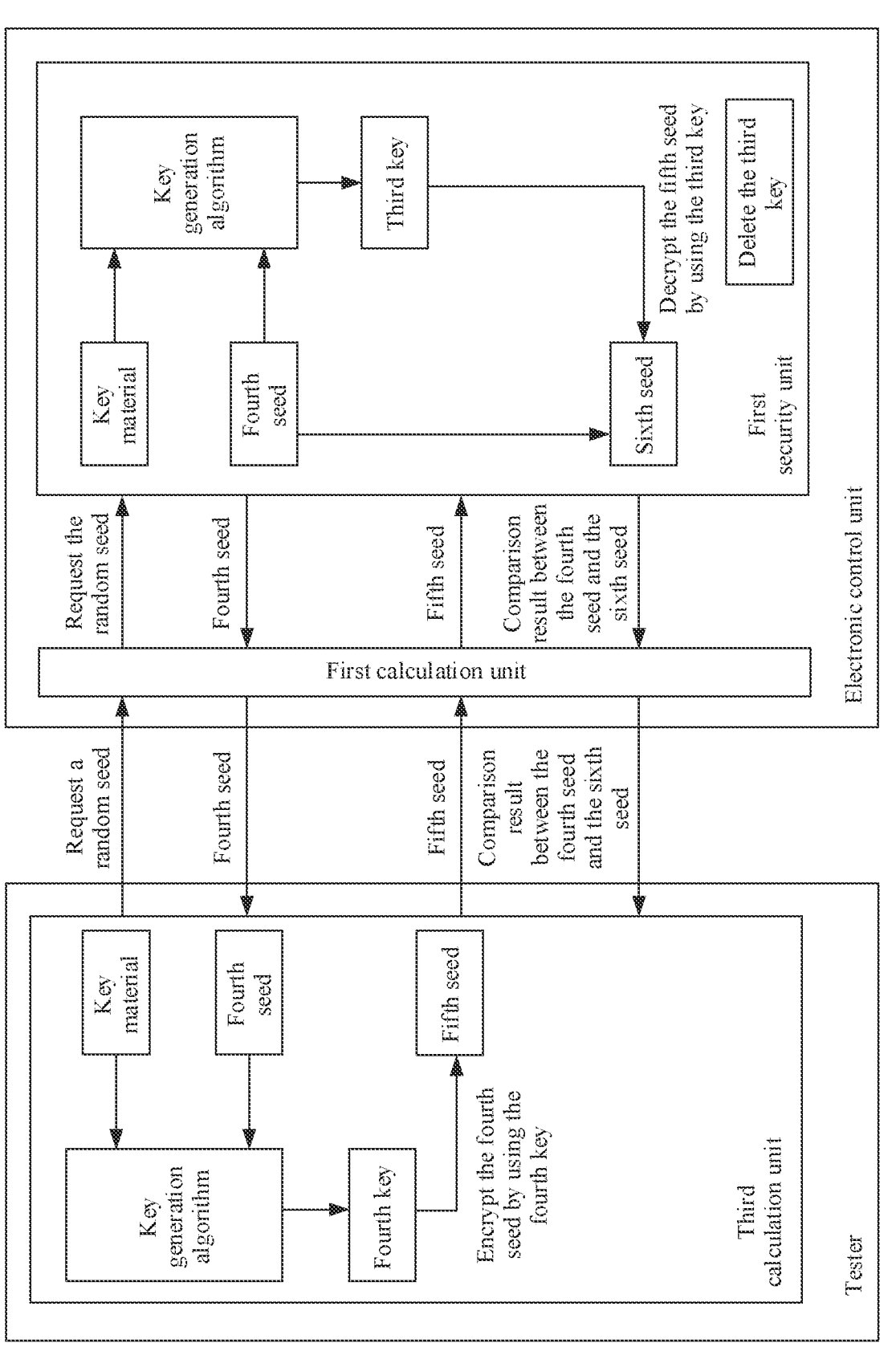
FIG. 7 is a second schematic interaction diagram of an authentication system according to an embodiment of this application.

For example, FIG. 7 is a second schematic interaction diagram of an authentication system according to an embodiment of this application. The authentication system may specifically implement the authentication method shown in FIG. 6.

As shown in FIG. 7, the authentication system includes an electronic control unit and a tester. The electronic control unit may include a first calculation unit and a first security unit, and the tester may include a third calculation unit.

The foregoing first device may be the electronic control unit shown in FIG. 7, and the foregoing third device may be the tester shown in FIG. 7. The first authentication unit shown in FIG. 6 may be the first security unit shown in FIG. 7, and the first service unit shown in FIG. 6 may be the first calculation unit shown in FIG. 7. The third service unit shown in FIG. 6 may be the third calculation unit shown in FIG. 7.

As shown in FIG. 7, the tester performs the authentication method shown in FIG. 6 in the third calculation unit. For example, the third calculation unit may send a security access request to the first calculation unit, and the third calculation unit may generate a fourth key in a same key generation manner as the first security unit, that is, based on a key generation algorithm and a key material that are stored in the third calculation unit and a fourth seed. For a specific implementation of the electronic control unit, refer to the electronic control unit shown in FIG. 5. Details are not described herein again.

In this way, with reference to FIG. 5 and FIG. 7, the electronic control unit may use the authentication method shown in FIG. 4 to authenticate, in the first authentication unit, permission of the tester shown in FIG. 5, and may also use the authentication method shown in FIG. 6 to authenticate, in the first authentication unit, permission of the tester shown in FIG. 7, so that the authentication method provided in this embodiment of this application is compatible with a conventional technology.

Figure 8:
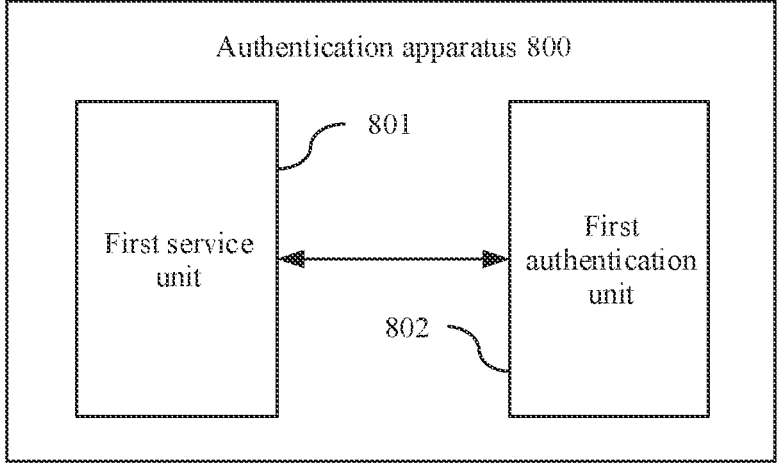
FIG. 8 is a first schematic structural diagram of an authentication apparatus according to an embodiment of this application.
Figure 9:
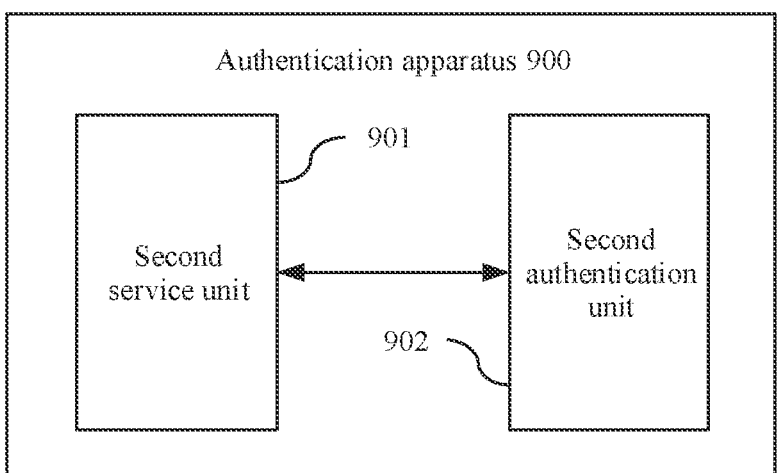
FIG. 9 is a second schematic structural diagram of an authentication apparatus according to an embodiment of this application.
Figure 10:
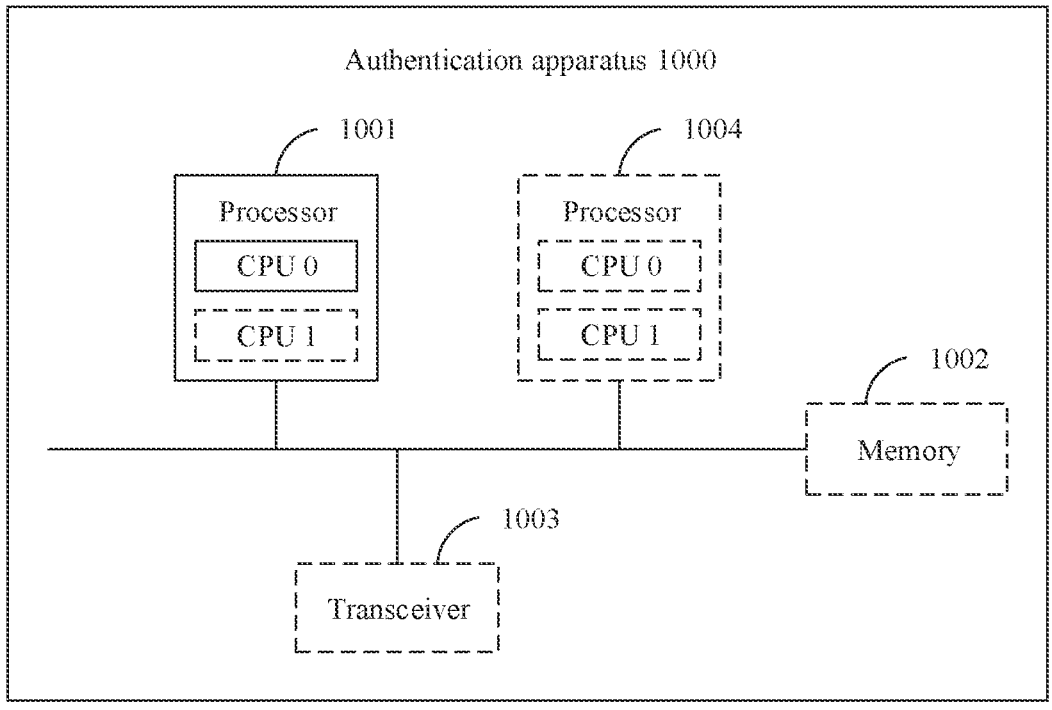
FIG. 10 is a third schematic structural diagram of an authentication apparatus according to an embodiment of this application.

The foregoing describes in detail the authentication methods provided in embodiments of this application with reference to FIG. 4 to FIG. 7. With reference to FIG. 8 to FIG. 10, the following describes in detail an authentication apparatus configured to perform the authentication method provided in embodiments of this application.

For example, FIG. 8 is a first schematic structural diagram of an authentication apparatus according to an embodiment of this application. As shown in FIG. 8, the authentication apparatus 800 includes a first service unit 801 and a first authentication unit 802. For ease of description, FIG. 8 shows only main components of the authentication apparatus.

In some embodiments, the authentication apparatus 800 may be used in the authentication system shown in FIG. 2, and perform a function of the first device in the authentication method shown in FIG. 4, or may be used in the authentication system shown in FIG. 3, and perform a function of the first device in the authentication method shown in FIG. 6.

The first service unit 801 is configured to receive a first request from a second device, where the first request is used to request a first seed.

The first service unit 801 is further configured to send the first request to the first authentication unit 802.

The first authentication unit 802 is configured to send a first response to the first service unit 801, where the first response includes the first seed.

The first service unit 801 is further configured to send the first response to the second device.

The first service unit 801 is further configured to receive a second seed from the second device.

The first service unit 801 is further configured to send the second seed to the first authentication unit 802.

The first authentication unit 802 is further configured to determine a third seed based on a first key and the second seed. The first key is determined based on the first seed.

The first authentication unit 802 is further configured to determine a matching result between the third seed and the first seed.

The first authentication unit 802 is further configured to send the matching result to the first service unit 801.

The first service unit 801 is further configured to send the matching result to the second device.

In a possible design solution, the first authentication unit 802 is further configured to determine the first key based on a first key material, a first key generation algorithm, and the first seed, where the first key material and the first key generation algorithm are stored in the first authentication unit 802.

Optionally, the first request may include an access level. Correspondingly, the first authentication unit 802 is further configured to determine the first key material and the first key generation algorithm based on the access level.

In another possible design solution, the first service unit 801 is further configured to send the second seed and identification information to the first authentication unit 802, where the identification information corresponds to the first key. The first authentication unit 802 is further configured to determine the first key based on the identification information.

Further, the first authentication unit 802 is further configured to send the identification information to the first service unit 801, where the identification information is determined based on the first key.

Optionally, the first authentication unit 802 is further configured to delete the first key.

Optionally, the first service unit 801 and the first authentication unit 802 may be integrated into one unit, for example, a processing unit. The processing unit is configured to implement a processing function of the authentication apparatus 800.

Optionally, the authentication apparatus 800 may further include a storage unit (not shown in FIG. 8), and the storage unit stores a program or instructions. When the processing unit executes the program or the instructions, the authentication apparatus 800 may perform the steps of the authentication method shown in any one of FIG. 4 to FIG. 7.

Optionally, the first service unit 801 may further include a transceiver subunit (not shown in FIG. 8), where the transceiver subunit is configured to implement a sending function and a receiving function of the first service unit 801. Further, the transceiver subunit may include a receiving subunit and a sending subunit (not shown in FIG. 8). The receiving subunit and the sending subunit are respectively configured to implement the receiving function and the sending function of the first service unit 801.

It should be understood that the first service unit 801 and the first authentication unit 802 in the authentication apparatus 800 may be implemented by a processor or a processor-related circuit component, and may be a processor or a processing unit. For example, the authentication apparatus 800 is an electronic control unit. The first service unit 801 may be a diagnostic security access component (DIAG_SA), and the first authentication unit 802 may be a diagnostic security access target component (DIAG_TA). The transceiver unit may be implemented by a transceiver or a transceiver-related circuit component, and may be a transceiver or a transceiver module.

It should be noted that, the authentication apparatus 800 may be a terminal device such as a vehicle-mounted terminal, a chip (system) or another part or component that may be disposed in the terminal device, or an apparatus that includes the terminal device such as a vehicle. This is not limited in this application.

In addition, for technical effects of the authentication apparatus 800, refer to the technical effects of the authentication method shown in any one of FIG. 4 to FIG. 7. Details are not described herein again.

For example, FIG. 9 is a second schematic structural diagram of an authentication apparatus according to an embodiment of this application. As shown in FIG. 9, the authentication apparatus 900 includes a second service unit 901 and a second authentication unit 902. For ease of description, FIG. 9 shows only main components of the authentication apparatus.

In some embodiments, the authentication apparatus 900 may be used in the authentication system shown in FIG. 2, and perform a function of the second device in the authentication method shown in FIG. 4.

The second authentication unit 902 is configured to send a first request to the second service unit 901, where the first request is used to request a first seed.

The second service unit 901 is configured to send the first request to a first device.

The second service unit 901 is further configured to receive a first response from the first device, where the first response includes the first seed.

The second service unit 901 is further configured to send the first response to the second authentication unit 902.

The second authentication unit 902 is further configured to send a second seed to the second service unit 901. The second seed is determined based on the first seed and a second key, and the second key is determined based on the first seed.

The second service unit 901 is further configured to send the second seed to the first device.

The second service unit 901 is further configured to receive a matching result sent by the first device.

In a possible design solution, the second authentication unit 902 is further configured to determine the second key based on a second key material, a second key generation algorithm, and the first seed. The second key material and the second key generation algorithm are stored in the second authentication unit 902.

Optionally, the second authentication unit 902 is further configured to delete the second key.

Optionally, the second service unit 901 and the second authentication unit 902 may be integrated into one unit, for example, a processing unit. The processing unit is configured to implement a processing function of the authentication apparatus 900.

Optionally, the authentication apparatus 900 may further include a storage unit (not shown in FIG. 9), and the storage unit stores a program or instructions. When the processing unit executes the program or the instructions, the authentication apparatus 900 may perform the steps of the authentication method shown in any one of FIG. 4 to FIG. 7.

Optionally, the second service unit 901 may further include a transceiver subunit (not shown in FIG. 9), where the transceiver subunit is configured to implement a sending function and a receiving function of the second service unit 901. Further, the transceiver subunit may include a receiving subunit and a sending subunit (not shown in FIG. 9). The receiving subunit and the sending subunit are respectively configured to implement the receiving function and the sending function of the second service unit 901.

It should be understood that the second service unit 901 and the second authentication unit 902 in the authentication apparatus 900 may be implemented by a processor or a processor-related circuit component, and may be a processor or a processing unit. The transceiver unit may be implemented by a transceiver or a transceiver-related circuit component, and may be a transceiver or a transceiver module.

It should be noted that, the authentication apparatus 900 may be a terminal device such as a vehicle-mounted diagnosis terminal, a chip (system) or another part or component that may be disposed in the terminal device, or an apparatus that includes the terminal device such as a vehicle. This is not limited in this application.

In addition, for technical effects of the authentication apparatus 900, refer to the technical effects of the authentication method shown in any one of FIG. 4 to FIG. 7. Details are not described herein again.

For example, FIG. 10 is a third schematic structural diagram of an authentication apparatus according to an embodiment of this application. The authentication apparatus may be a terminal device or a network device, or may be a chip (system) or another part or component that may be disposed in the terminal device or the network device. As shown in FIG. 10, the authentication apparatus 1000 may include a processor 1001. Optionally, the authentication apparatus 1000 may further include a memory 1002 and/or a transceiver 1003. The processor 1001 is coupled to the memory 1002 and the transceiver 1003, for example, may be connected to the memory 1002 and the transceiver 1003 through a communication bus.

The following describes each component of the authentication apparatus 1000 in detail with reference to FIG. 10.

The processor 1001 is a control center of the authentication apparatus 1000, and may be one processor, or may be a collective term of a plurality of processing elements. For example, the processor 1001 is one or more central processing units (CPUs), or may be an application-specific integrated circuit (ASIC), or is configured as one or more integrated circuits implementing embodiments of this application, for example, one or more microprocessors (digital signal processors, DSPs) or one or more field programmable gate arrays (FPGAs).

Optionally, the processor 1001 may perform various functions of the authentication apparatus 1000 by running or executing a software program stored in the memory 1002 and invoking data stored in the memory 1002.

During specific implementation, in an embodiment, the processor 1001 may include one or more CPUs, for example, a CPU 0 and a CPU 1 shown in FIG. 10.

During specific implementation, in an embodiment, the authentication apparatus 1000 may alternatively include a plurality of processors, such as the processor 1001 and a processor 1004 shown in FIG. 2. Each of the processors may be a single-core (single-CPU) processor, or may be a multi-core (multi-CPU) processor. The processor herein may be one or more devices, circuits, and/or processing cores configured to process data (for example, computer program instructions).

In addition, the processor 1001 or the processor 1004 may be configured to implement a processing function of the first service unit and/or the first authentication unit in the first device, or configured to implement a processing function of the second service unit and/or the second authentication unit in the second device.

The memory 1002 is configured to store the software program for executing the solutions in this application, and the processor 1001 controls execution. For a specific implementation, refer to the foregoing method embodiments. Details are not described herein again.

Optionally, the memory 1002 may be a read-only memory (ROM) or another type of static storage device that can store static information and instructions, a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be configured to carry or store expected program code in a form of instructions or a data structure and that can be accessed by a computer. However, this is not limited thereto. The memory 1002 may be integrated with the processor 1001, or may exist independently, and is coupled to the processor 1001 through an interface circuit (not shown in FIG. 10) of the authentication apparatus 1000. This is not specifically limited in this embodiment of this application.

The transceiver 1003 is configured to communicate with another authentication apparatus. For example, the authentication apparatus 1000 is a terminal device, and the transceiver 1003 may be configured to communicate with a network device or communicate with another terminal device. For another example, the authentication apparatus 1000 is a network device, and the transceiver 1003 may be configured to communicate with a terminal device or communicate with another network device.

In addition, the transceiver 1003 may be configured to implement a receiving function and a sending function of the first service unit in the first device, or configured to implement a receiving function and a sending function of the second service unit in the second device.

Optionally, the transceiver 1003 may include a receiver and a transmitter (not separately shown in FIG. 10). The receiver is configured to implement a receiving function, and the transmitter is configured to implement a sending function.

Optionally, the transceiver 1003 may be integrated with the processor 1001, or may exist independently, and is coupled to the processor 1001 through an interface circuit (not shown in FIG. 10) of the authentication apparatus 1000. This is not specifically limited in this embodiment of this application.

It should be noted that, the structure of the authentication apparatus 1000 shown in FIG. 10 does not constitute a limitation on the authentication apparatus. An actual authentication apparatus may include more or fewer components than those shown in the figure, combine some components, or have different component arrangements.

In addition, for technical effects of the authentication apparatus 1000, refer to the technical effects of the authentication method according to the method embodiments. Details are not described herein again.

An embodiment of this application further provides a chip system, including a processor. The processor is coupled to a memory, the memory is configured to store a program or instructions, and when the program or the instructions are executed by the processor, the chip system is enabled to implement the method in any one of the foregoing method embodiments.

Optionally, there may be one or more processors in the chip system. The processor may be implemented by using hardware, or may be implemented by using software. When the processor is implemented by using the hardware, the processor may be a logic circuit, an integrated circuit, or the like. When the processor is implemented by using the software, the processor may be a general-purpose processor, and is implemented by reading software code stored in the memory.

Optionally, there may also be one or more memories in the chip system. The memory may be integrated with the processor, or may be disposed separately from the processor. This is not limited in this application. For example, the memory may be a non-transitory processor, for example, a read-only memory ROM. The memory and the processor may be integrated into a same chip, or may be separately disposed on different chips. A type of the memory and a manner of disposing the memory and the processor are not specifically limited in this application.

For example, the chip system may be a field programmable gate array (FPGA), an application-specific integrated circuit (ASIC), a system on chip (SoC), a central processing unit (CPU), a network processor (NP), a digital signal processor (DSP), a microcontroller unit (MCU), a programmable logic device (PLD), or another integrated chip.

An embodiment of this application provides an authentication system. The authentication system includes the foregoing first device and the foregoing second device.

It should be understood that, the processor in embodiments of this application may be a central processing unit (CPU). The processor may be further another general-purpose processor, a digital signal processor (DSP), an application-specific integrated circuit ASIC), a field programmable gate array (FPGA), or another programmable logic device, discrete gate or transistor logic device, discrete hardware component, or the like. The general-purpose processor may be a microprocessor, or the processor may be any conventional processor or the like.

It should be further understood that the memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitative description, many forms of random access memories (RAMS) may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

All or some of the foregoing embodiments may be implemented by software, hardware (for example, a circuit), firmware, or any combination thereof. When software is used to implement embodiments, all or some of the foregoing embodiments may be implemented in a form of a computer program product. The computer program product includes one or more computer instructions or computer programs. When the computer instructions or the computer programs are loaded or executed on a computer, the procedure or functions according to embodiments of this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible to the computer, or a data storage device, for example, a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects and represents that three relationships may exist. For example, A and/or B may represent the following three cases: only A exists, both A and B exist, and only B exists. A and B may be singular or plural. In addition, the character "/" in this specification usually indicates an "or" relationship between the associated objects, but may also indicate an "and/or" relationship. For details, refer to the context for understanding.

In this application, "at least one" means one or more, and "a plurality of" means two or more. "At least one of the following items (pieces)" or a similar expression thereof refers to any combination of these items, including any combination of singular items (pieces) or plural items (pieces). For example, at least one item (piece) of a, b, or c may indicate a, b, c, a and b, a and c, b and c, or a, b, and c, where a, b, and c may be singular or plural.

It should be understood that sequence numbers of processes do not mean execution sequences in embodiments of this application. The execution sequences of the processes should be determined based on functions and internal logic of the processes, and should not be construed as any limitation on the implementation processes of embodiments of this application.

A person of ordinary skill in the art may be aware that, in combination with examples described in embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division, and may be other division during actual implementation. For example, a plurality of units or components may be combined or may be integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or a part of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An authentication method, applied to a first device, wherein the first device comprises a transceiver, a first service processor storing service information of the first device, and a first authentication processor, wherein an authentication operation in the first authentication processor is isolated from the service information in the first service processor, and wherein the method comprises:
  receiving, by the first service processor through the transceiver, a first request from a second device, wherein the first request is used to request a first seed;
  sending, by the first service processor, the first request to the first authentication processor;
  sending, by the first authentication processor, a first response to the first service processor, wherein the first response comprises the first seed;
  sending, by the first service processor through the transceiver, the first response to the second device;
  receiving, by the first service processor through the transceiver, a second seed from the second device;
  sending, by the first service processor, the second seed to the first authentication processor;
  determining, by the first authentication processor, a third seed based on a first key and the second seed, wherein the first key is determined based on the first seed;
  determining, by the first authentication processor, a matching result between the third seed and the first seed;
  sending, by the first authentication processor, the matching result to the first service processor; and
  sending, by the first service processor through the transceiver, the matching result to the second device.

2. The authentication method according to claim 1, wherein the method further comprises:
  determining, by the first authentication processor, the first key based on a first key material, a first key generation algorithm, and the first seed, wherein the first key material and the first key generation algorithm are stored in the first authentication processor.

3. The authentication method according to claim 2, wherein the first request comprises an access level, and before the determining, by the first authentication processor, the first key based on a first key material, a first key generation algorithm, and the first seed, the method further comprises:
  determining, by the first authentication processor, the first key material and the first key generation algorithm based on the access level.

4. The authentication method according to claim 1, wherein:
  the sending, by the first service processor, the second seed to the first authentication processor comprises:
    sending, by the first service processor, the second seed and identification information to the first authentication processor, wherein the identification information corresponds to the first key; and
  before the determining, by the first authentication processor, a third seed based on a first key and the second seed, the method further comprises:
    determining, by the first authentication processor, the first key based on the identification information.

5. The authentication method according to claim 4, wherein the method further comprises:
  sending, by the first authentication processor, the identification information to the first service processor, wherein the identification information is determined based on the first key.

6. The authentication method according to claim 1, wherein the method further comprises:
  deleting, by the first authentication processor, the first key.

7. An authentication method, applied to a second device, wherein the second device comprises a transceiver, a second service processor storing service information of the second device, and a second authentication processor, wherein an authentication operation in the second authentication processor is isolated from the service information in the second service processor, and wherein the method comprises:
  sending, by the second authentication processor, a first request to the second service processor, wherein the first request is used to request a first seed;
  sending, by the second service processor through the transceiver, the first request to a first device;
  receiving, by the second service processor through the transceiver, a first response from the first device, wherein the first response comprises the first seed;
  sending, by the second service processor, the first response to the second authentication processor;
  sending, by the second authentication processor, a second seed to the second service processor, wherein the second seed is determined based on the first seed and a second key, and the second key is determined based on the first seed;
  sending, by the second service processor through the transceiver, the second seed to the first device; and
  receiving, by the second service processor through the transceiver, a matching result from the first device.

8. The authentication method according to claim 7, wherein the method further comprises:
  determining, by the second authentication processor, the second key based on a second key material, a second key generation algorithm, and the first seed, wherein the second key material and the second key generation algorithm are stored in the second authentication processor.

9. The authentication method according to claim 7, wherein the method further comprises:
  deleting, by the second authentication processor, the second key.

10. An authentication apparatus, wherein the authentication apparatus comprises a transceiver, a first service processor configured to store service information of the authentication apparatus, and a first authentication processor, and wherein:

an authentication operation in the first authentication processor is isolated from the service information in the first service processor;

the first service processor is configured to receive a first request from a second device through the transceiver, wherein the first request is used to request a first seed;

the first service processor is further configured to send the first request to the first authentication processor;

the first authentication processor is configured to send a first response to the first service processor, wherein the first response comprises the first seed;

the first service processor is further configured to send the first response to the second device through the transceiver;

the first service processor is further configured to receive a second seed from the second device through the transceiver;

the first service processor is further configured to send the second seed to the first authentication processor;

the first authentication processor is further configured to determine a third seed based on a first key and the second seed, wherein the first key is determined based on the first seed;

the first authentication processor is further configured to determine a matching result between the third seed and the first seed;

the first authentication processor is further configured to send the matching result to the first service processor; and the first service processor is further configured to send the matching result to the second device through the transceiver.

11. The authentication apparatus according to claim 10, wherein the first authentication processor is further configured to determine the first key based on a first key material, a first key generation algorithm, and the first seed, wherein the first key material and the first key generation algorithm are stored in the first authentication processor.

12. The authentication apparatus according to claim 11, wherein the first request comprises an access level, and the first authentication processor is further configured to determine the first key material and the first key generation algorithm based on the access level.

13. The authentication apparatus according to claim 10, wherein:

the first service processor is further configured to send the second seed and identification information to the first authentication processor, wherein the identification information corresponds to the first key; and the first authentication processor is further configured to determine the first key based on the identification information.

14. The authentication apparatus according to claim 13, wherein the first authentication processor is further configured to send the identification information to the first service processor, and wherein the identification information is determined based on the first key.

15. The authentication apparatus according to claim 10, wherein the first authentication processor is further configured to delete the first key.

16. An authentication apparatus, wherein the authentication apparatus comprises a transceiver, a second service processor configured to service information of the authentication apparatus, and a second authentication processor, and wherein:

an authentication operation in the second authentication processor is isolated from the service information in the second service processor;

the second authentication processor is configured to send a first request to the second service processor, wherein the first request is used to request a first seed;

the second service processor is configured to send the first request to a first device through the transceiver;

the second service processor is further configured to receive a first response from the first device through the transceiver, wherein the first response comprises the first seed;

the second service processor is further configured to send the first response to the second authentication processor;

the second authentication processor is further configured to send a second seed to the second service processor, wherein the second seed is determined based on the first seed and a second key, and the second key is determined based on the first seed;

the second service processor is further configured to send the second seed to the first device through the transceiver; and the second service processor is further configured to receive a matching result sent by the first device through the transceiver.

17. The authentication apparatus according to claim 16, wherein the second authentication processor is further configured to determine the second key based on a second key material, a second key generation algorithm, and the first seed, and wherein the second key material and the second key generation algorithm are stored in the second authentication processor.

18. The authentication apparatus according to claim 16, wherein the second authentication processor is further configured to delete the second key.

* * * * *